UNITED STATES PATENT OFFICE.

JUNIUS B. WASHBURN, OF JERSEY CITY, NEW JERSEY, ASSIGNOR TO THE DRUID FELT COMPANY, OF MARYLAND.

ROOF-PAINT.

SPECIFICATION forming part of Letters Patent No. 394,318, dated December 11, 1888.

Application filed July 13, 1886. Serial No. 207,910. (No specimens.)

*To all whom it may concern:*

Be it known that I, JUNIUS B. WASHBURN, a citizen of the United States, residing in Jersey City, in the county of Hudson and State of New Jersey, have invented a new and useful Composition of Matter to be Used in Painting Roofs, of which the following is a specification.

My composition consists of the following ingredients, which are combined in the proportions stated, as follows: Coal-tar, three hundred (300) pounds; ground soapstone, twenty (20) pounds; peroxide of iron, twenty-five (25) pounds.

The coal-tar, if applied to a painted roof, should first be heated, so that it may penetrate the old paint. The remaining ingredients are then added, the whole being thoroughly mixed by stirring. The composition is then applied with brushes, and spread upon the surface to which it is applied to any desired thickness. Common sand is then sprinkled upon the composition in order to prevent running, and it soon hardens and forms a dense but elastic covering, which is absolutely water-proof, and which will not crack or peel off.

I am aware that a patent has been granted for a roof-paint consisting of peroxide of iron, hydraulic cement, soapstone, gypsum, and coal-tar. Such a compound I do not claim.

Having fully described my invention, what I claim, and desire to secure by Letters Patent, is—

The herein-described composition of matter to be used for painting roofs, consisting of coal-tar, ground soapstone, and peroxide of iron, in the proportions specified.

JUNIUS B. WASHBURN.

Witnesses:
WM. L. VAN DERZEE,
HENRY L. WASHBURN.